(12) United States Patent
Bateham

(10) Patent No.: US 11,920,552 B2
(45) Date of Patent: Mar. 5, 2024

(54) TURBINE WITH DYNAMIC BLADES

(71) Applicant: Yourbrook Energy Systems Ltd., Queen Charlotte (CA)

(72) Inventor: Laird Bateham, Queen Charlotte (CA)

(73) Assignee: Yourbrook Energy Systems Ltd., Queen Charlotte (CA)

( * ) Notice: Subject to any disclaimer, the term of this patent is extended or adjusted under 35 U.S.C. 154(b) by 0 days.

(21) Appl. No.: 18/013,507

(22) PCT Filed: Jun. 18, 2021

(86) PCT No.: PCT/US2021/038144
§ 371 (c)(1),
(2) Date: Dec. 28, 2022

(87) PCT Pub. No.: WO2022/010633
PCT Pub. Date: Jan. 13, 2022

(65) Prior Publication Data
US 2023/0243331 A1    Aug. 3, 2023

Related U.S. Application Data

(60) Provisional application No. 63/048,281, filed on Jul. 6, 2020.

(51) Int. Cl.
*F03B 13/26* (2006.01)
(52) U.S. Cl.
CPC ........ *F03B 13/264* (2013.01); *F05B 2240/30* (2013.01); *F05B 2260/505* (2013.01)
(58) Field of Classification Search
CPC ................ F03B 13/264; F05B 2260/505

USPC ..................................... 290/43, 53
See application file for complete search history.

(56) References Cited

U.S. PATENT DOCUMENTS

| | | | |
|---|---|---|---|
| 8,354,758 B1* | 1/2013 | Boschma | F03B 17/065 290/43 |
| 8,593,005 B2* | 11/2013 | Drews | F03B 17/065 290/43 |
| 2012/0262036 A1 | 10/2012 | Drews | |
| 2016/0141987 A1* | 5/2016 | Bergman | F03B 15/08 290/43 |

FOREIGN PATENT DOCUMENTS

| | | |
|---|---|---|
| CN | 1064133 C | 4/2001 |
| CN | 104564486 B | 8/2016 |
| DE | 10134522 B4 | 7/2005 |
| DE | 102008003764 A1 | 8/2009 |

(Continued)

OTHER PUBLICATIONS

Stream Wheels For applications In Shallow and Deep Water, by Gerald Müller et al., 32nd IAHR Conference 2007, Venice, Italy Jul. 1-6, 2007.

*Primary Examiner* — Michael L Sehn
(74) *Attorney, Agent, or Firm* — Oyen Wiggs Green & Mutala LLP

(57) ABSTRACT

Undershot turbines with dynamic blades are disclosed for improving energy capture from a flowing stream. The blades are provided on respective rotatable swing arm assemblies attached to the circumference of a turbine support. In operation, the blades are uniquely adjusted as a function of rotation of the support wheel for improved efficiency and energy capture.

17 Claims, 11 Drawing Sheets

(56) References Cited

FOREIGN PATENT DOCUMENTS

| | | |
|---|---|---|
| DE | 102009009391 A1 | 8/2010 |
| EP | 1752657 A1 | 2/2007 |
| EP | 2857674 A2 | 4/2015 |
| GB | 2436704 A | 10/2007 |
| RU | 2016220 C1 | 7/1994 |
| TW | 200406541 A | 5/2004 |
| WO | 2004085841 A1 | 10/2004 |
| WO | 2013113109 A1 | 8/2013 |

* cited by examiner

US 11,920,552 B2

TURBINE WITH DYNAMIC BLADES

CROSS-REFERENCE TO RELATED APPLICATIONS

This application is a 371 national phase entry of Patent Cooperation Treaty application No. PCT/US2021/038144 filed 18 Jun. 2021 entitled TURBINE WITH DYNAMIC BLADES, which is incorporated by reference herein in its entirety, and which claims priority to, and the benefit of, U.S. provisional patent application No. 63/048,281 filed 6 Jul. 2020.

TECHNICAL FIELD

The present invention relates to turbine designs and methods of operation for capturing energy from a flowing stream. In particular, it relates to turbines with adjustable blades that are uniquely adjusted as the turbine wheel rotates for improved energy capture in low and zero head applications such as tidal streams.

BACKGROUND

Since ancient times, humans have been harnessing natural available flows of water as an energy source for doing useful work. The flow from streams has long been used for applications including milling flour, hammering wrought iron, grinding wood, and the like. The flows associated with larger rivers and the ocean tides have also long been seen as untapped sources of energy. Greener sources of energy like those available from the naturally occurring flows of water are receiving increased attention these days in order to wean society off its use of hydrocarbon fuels for energy production.

Conventional hydroelectric dams can provide a substantial amount of clean energy with very efficient use of the energy available in the water flow involved. Here however, significant altitudes (or "heads") are involved in order to obtain these favorable results. The water involved is collected from greater surrounding elevations into a reservoir which has been created by damming the further flow of the water. The reservoir itself is still at some significant altitude. A regulated supply of electricity is then efficiently provided by allowing controlled amounts of the collected water to drive generator turbines as it flows downhill.

A substantial amount of energy is inherently available in the movement of massive amounts of ocean water associated with the tides. However, it is difficult to practically extract tidal energy in the manner used by conventional hydroelectric dams. This is because it is generally impractical to collect tidal water into suitably large reservoirs and because the altitude change of the water driving the generator turbines (i.e. the "head" difference in height between high and low tides) is inefficiently small. Nonetheless, in some locations in the world, where the tides are highest and natural geography allows for the formation of natural reservoirs, power plants based on these methods have been put into operation.

Instead of creating a reservoir from a source or sources of water, energy can also be obtained directly from the flowing water itself. Waterwheels have been used for centuries for this purpose and are suitable for capturing energy from various shallow water flows (e.g. from streams, rivers, or tides). However, the efficiency of waterwheels has been limited. Over time, improvements have been made to waterwheel and also to turbine designs which have improved energy capture and efficiency. Still, efficiently capturing energy from shallow water flows remains a challenge. As discussed in "Stream Wheels For applications In Shallow and Deep Water", by Gerald Müller et al., 32nd IAHR Conference 2007, Venice, Italy 01-6 Jul. 2007, conventional undershot waterwheels derive most of their energy from drag forces acting on the blades. Other types of devices (e.g. turbines) can derive energy from lift. Typical efficiency levels however are in the 25-35% range. Further, conventional waterwheels have a typical maximum practical dip depth of about 25-30% of the wheel diameter in order to minimize shoveling by the trailing blades. And further still, the optimal RPM of the waterwheel for energy capture is a mere fraction (e.g. about 0.44) of that fundamentally possible for a given stream velocity.

Even with present limitations to efficiency, numerous waterwheel and turbine designs are available commercially. And to improve upon this, numerous others have been suggested in the literature. For instance, CN104564486 discloses a waterwheel power generation device using chains to allow waterwheel blades to be synchronously vertical. The device comprises a waterwheel with a plurality of blades, an acceleration gear box, and a power generation unit. Here, the waterwheel power generation device has the advantages that the blades are mounted on the waterwheel in a way that the blades are vertical to a flowing water plane, the blades can be driven under the impacts of the flowing water, and the blades are allowed to be constantly vertical to the flowing water plane.

DE10134522 describes an undershot water wheel which has first blades, adjustment elements for adjusting the angular settings depending on the current rotation angle of the water wheel and a controller for the adjustment elements. Second blades with a smaller radial dimension arranged between the first blades likewise have adjustment elements for adjustment of their angular setting with the water wheel rotation angle.

US2012262036 discloses a waterwheel that is provided to embody as a modularly constructed system for generating power via generators with transversely extending water blades as hinged or folding blades. In this regard it is provided to arrange the water blades over a truss framework.

TW200406541 discloses an improvement to a conventional water turbine comprising blades of fixed length in which, when the water turbine is in rotation, torques caused by the weight of the blades exactly cancel each other so that the driving force of the water turbine is provided by the blades driven by water flows only. The improvement provided a water turbine device, which is characterized by comprising length-adjustable blades.

In other instances, EP2857674 discloses a variable blade type tidal and wind power generator with increased generation efficiency. Further, DE102008003764 discloses a polygon-shaped wind- and water rotor for power generation, which has movable surfaces standing away from vertical rotor in forward-running region, where attainable torque of rotor is higher compared to vertical rotor with rigid surfaces.

In yet other instances, GB2436704 discloses an undershot waterwheel comprising at least one paddle having a blade that is curved, when viewed in a direction parallel to the axis of rotation of the waterwheel. EP1752657 discloses a vertical blade waterwheel power generator and method of waterpower generation. DE102009009391 discloses an energy generating device, which has adjustable blades adjustable in non-usage position opposite to shaft or strip-shaped support by connecting rod.

Despite the many improvements which have been suggested and developed over the centuries, there remains a continuing desire to increase the energy captured from flowing streams and to improve device efficiency. The present invention addresses this desire and provides further advantages as discussed below.

SUMMARY

Improved designs and operating methods have been discovered for turbines for undershot applications, namely for capturing energy from a flowing stream having a horizontal flow direction and velocity. Advantageously, higher rotation rates and greater dip depths can be obtained with such turbines. A feature of the invention is a reduction in the downstream drift in the turbine blades during operation (i.e. a reduction in the horizontal distance travelled by the blades when dipped in the stream). Accordingly, energy capture and efficiency can be improved.

A turbine of the invention is designed for undershot applications and comprises a frame, a wheel assembly, a plurality of swing arm assemblies with attached blades, and a timing assembly for controlling the rotation of the swing arms and attached blades. Specifically, the wheel assembly comprises a horizontal wheel axle and a support wheel having a centre and a circumference in which the wheel axle is located at the centre of the support wheel. Further, the support wheel is rotatably mounted with respect to the frame and this can either involve suitable arrangements in which the support wheel is directly attached to the wheel axle (and hence both rotate with respect to the frame) or in which the support wheel is not directly attached to the wheel axle (and in which only the support wheel rotates with respect to the frame). Each of the plurality of swing arm assemblies in the turbine comprises a horizontal swing arm shaft, a swing arm, and a blade. The swing arm shaft is located at the circumference of the support wheel. The swing arm has two ends, namely an axle end and a blade end. The swing arm shaft is located at the axle end of the swing arm and the blade is attached to the blade end of the swing arm. Further, the swing arm is rotatably mounted with respect to the support wheel.

The timing assembly is configured to control the rotation of each swing arm with attached blade such that, as the support wheel rotates, each swing arm with attached blade rotates counter to the direction of rotation of the support wheel. Further it is configured such that each swing arm with attached blade completes one full revolution for every full revolution of the support wheel and such that each blade is i) rotated inboard of its respective swing arm shaft before it enters the stream, ii) then rotated outboard of its respective swing arm shaft as it passes through the stream, and iii) then rotated inboard of its respective swing arm shaft before it exits the stream.

In some embodiments, the timing assembly can be configured to control the rotation of each swing arm with attached blade such that in step i) each blade enters the stream essentially vertically. In these and/or other embodiments, the timing assembly can also be configured to control the rotation of each swing arm with attached blade such that in step iii) each blade exits the stream essentially vertically. Further, in these and/or other embodiments, the timing assembly can be configured to control the rotation of each swing arm with attached blade such that in step ii) each blade is essentially horizontal when its respective swing arm shaft is passing through its lowest point in the stream. In these and/or yet other embodiments, the timing assembly can be configured to control the rotation of each swing arm with attached blade such that each blade is essentially horizontal when its respective swing arm shaft is at its lowest or highest point with respect to the stream and essentially vertical when its respective swing arm shaft is midway between its lowest and highest points with respect to the stream.

In simple exemplary embodiments, the timing assembly is configured such that the plurality of swing arms with attached blades rotate in synchrony at a constant rate. In slightly more complex embodiments, the timing assembly can instead be configured to advance or retard the rotation of each of the swing arms with attached blades as the support wheel rotates (e.g. up to about 20 degrees in rotation).

Support wheels suitable for use in the invention can comprise a pair of side supports (e.g. sets of spokes or solid side plates) with the wheel axle being located at the centre of the support wheel between the pair of side supports. In such an embodiment, each of the swing arm assemblies can comprise a pair of swing arms in which each swing arm shaft is located at the axle end of each of the pair of swing arms and between each of the pair of swing arms.

Suitable timing assemblies for use in the invention can be quite simple mechanically (e.g. comprising a set of sprockets for each of the swing arms with attached blades, a stationary sprocket around the wheel axle, and a drive chain system interconnecting each of the set of sprockets and the stationary sprocket) or alternatively more complex for more complex control of the individual swing arm assemblies (e.g. comprising more complex mechanical designs and/or including pneumatically or hydraulically operated mechanisms).

Exemplary embodiments of such turbines may preferably comprise greater than or equal to three swing arm assemblies. Further, a variety of shapes may be employed for the blades. For instance, the blades may simply be flat but as another option, the profile of each of the blades may be shaped to match the swing arm radius (i.e. wherein the distance between each of the blade centres and the swing arm shafts is what defines the "swing arm radius"). Yet other blade shape options may be considered.

Desirable embodiments of the invention are characterized by significant reduction in the downstream drift of the turbine blades when compared to conventional waterwheels and the like. In the present turbines, if the distance between each of the swing arm shafts and the wheel axle is used to define a "support wheel radius" and the distance between each of the blade centres and the swing arm shafts defines "a swing arm radius", an example of turbine showing a significant reduction in downstream drift is one in which the ratio of the swing arm radius/support wheel radius is greater than or about 0.33, and particularly in which this ratio is greater than or about 0.67.

In an associated method of the invention, an increased amount of energy can be captured from the surface of a flowing stream by obtaining the aforementioned turbine, dipping the turbine into the stream to an appropriate dip depth, allowing the support wheel to rotate at a wheel velocity and thus capturing energy from the rotating support wheel. As one of numerous advantages provided by the invention, the turbine may be dipped into the flowing stream to depths greater than those considered appropriate for conventional waterwheels and thereby obtain greater energy capture from the stream. For instance, the turbine may be dipped to depths up to 90% or even potentially 100% of the support wheel radius.

BRIEF DESCRIPTION OF THE DRAWINGS

FIG. 2a shows the turbine at a point when blades on opposite sides of the support wheel are passing through high and low points in their rotation respectively. FIG. 2b shows the turbine at a point when blades on opposite sides of the support wheel are just entering and exiting the stream respectively.

FIG. 2c shows a side view of the turbine of FIG. 1 when the rotation of the support wheel and each of the swing arms with attached blades has been advanced with respect to that shown in FIG. 2a.

FIG. 5a shows a momentary point in the rotation where stream flow to a trailing blade is protected from adverse effects by upstream blade. FIG. 5b shows a point just further along in the rotation where stream flow is redirected by the upstream blade to the trailing blade.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

The terms "essentially vertical" and "essentially horizontal" are to be construed as including orientations of turbine blades that are actually vertical and horizontal respectively but also approximately so if such approximate orientations do not materially affect the characteristics and results associated with the invention. For instance, in embodiments with flat or planar blades, blade orientations would be considered to be essentially vertical or horizontal if they were angled at or within a few degrees of true vertical or horizontal respectively. For embodiments comprising non-planar blade designs however, definitions of vertical and horizontal are themselves required. In the context of a non-planar blade design, herein the vertical and horizontal with respect to a given blade refers to those directions taken at the centre of that blade and perpendicular to the orientation of that blade's associated swing arm.

As used herein, the words "inboard" and "outboard" refer to positions of a given blade with respect to its associated swing arm shaft and the wheel axle of the wheel assembly. Specifically, a blade is considered to be inboard when its centre is positioned closer to the wheel axle of the wheel assembly than its associated swing arm shaft is. A blade is considered to be outboard when its centre is positioned farther from the wheel axle of the wheel assembly than its associated swing arm shaft is.

The term "support wheel radius" is defined as the distance between each of the swing arm shafts and the wheel axle.

The term "swing arm radius" is defined as the distance between each of the blade centres and the swing arm shafts.

In the following, turbine designs and operating methods are disclosed for improved energy capture in undershot applications. With these, higher rotation rates and greater dip depths can be obtained when compared to conventional waterwheels. The turbine comprises a plurality of dynamically adjusted blades which are driven by both drag and lift forces provided from a horizontally flowing stream. These designs allow for a desirable reduction in the downstream drift of the turbine blades and also cleaner entry and exit of the turbine blades during operation.

Figure 1:
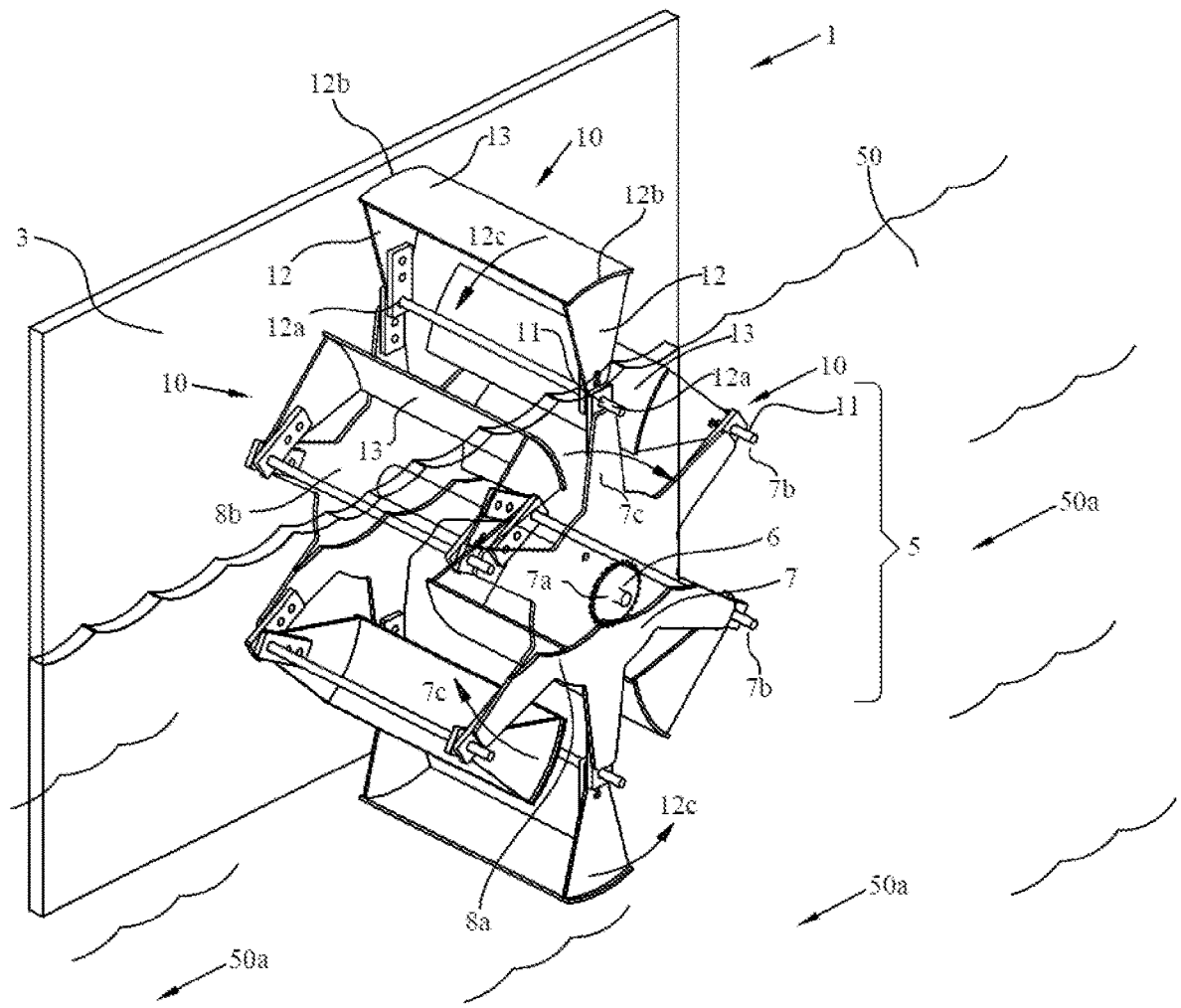
FIG. 1 shows an isometric view of an exemplary turbine of the invention in a flowing tidal stream.

FIGS. 1 through 5 are illustrative of exemplary embodiments of the invention. For instance, FIG. 1 shows an isometric view of a simple exemplary turbine in a flowing tidal stream. In FIG. 1, undershot turbine 1 is shown dipped in flowing tidal stream 50 which is flowing in horizontal direction 50a. Turbine 1 comprises frame 3, wheel assembly 5, a plurality of swing arm assemblies 10, and timing assembly 20 (not visible in FIG. 1). Wheel assembly 5 comprises horizontal wheel axle 6 and support wheel 7. Support wheel 7 has a centre 7a and circumference 7b. Support wheel 7 comprises two side supports 8a, 8b on opposite sides of wheel 7. Wheel axle 6 is located at centre 7a in between side supports 8a, 8b. In this embodiment, wheel axle 6 is fixed to and thus remains stationary with respect to frame 3. Bushing and/or bearing assemblies (not shown) are provided to allow support wheel 7 to rotate smoothly around wheel axle 6 (and hence also with respect to frame 3) in the direction shown by arrow 7c.

The turbine 1 of FIG. 1 has six swing arm assemblies 10 spaced around circumference 7b. Each swing arm assembly 10 comprises a horizontal swing arm shaft 11 located at circumference 7b, a pair of swing arms 12, and blade 13. Swing arms 12 each have an axle end 12a and blade end 12b. Swing arm shafts 11 are located between corresponding pairs of swing arms 12 at their axle ends 12a. Blades 13 are attached between corresponding pairs of swing arms 12 at their blade ends 12b. Each swing arm/blade unit 12/13 (comprising pair of swing arms 12 with attached blade 13) can rotate with respect to support wheel 7 around their respective swing arm shafts 11.

As support wheel 7 rotates in flowing stream 50, timing assembly 20 controls the rotation of swing arm/blade unit 12/13. In the most basic embodiment of the invention, each swing arm/blade unit 12/13 rotates (shown by arrow 12c) counter to the direction of rotation of support wheel and completes one full revolution for every full revolution of support wheel 7. Further, rotation of each is controlled such that each blade 13 is: i) rotated inboard of its respective swing arm shaft 11 before it enters stream 50, ii) then rotated outboard of its respective swing arm shaft 11 as it passes through stream 50, and iii) then rotated inboard of its respective swing arm shaft 11 before it exits stream 50.

Figure 2A:
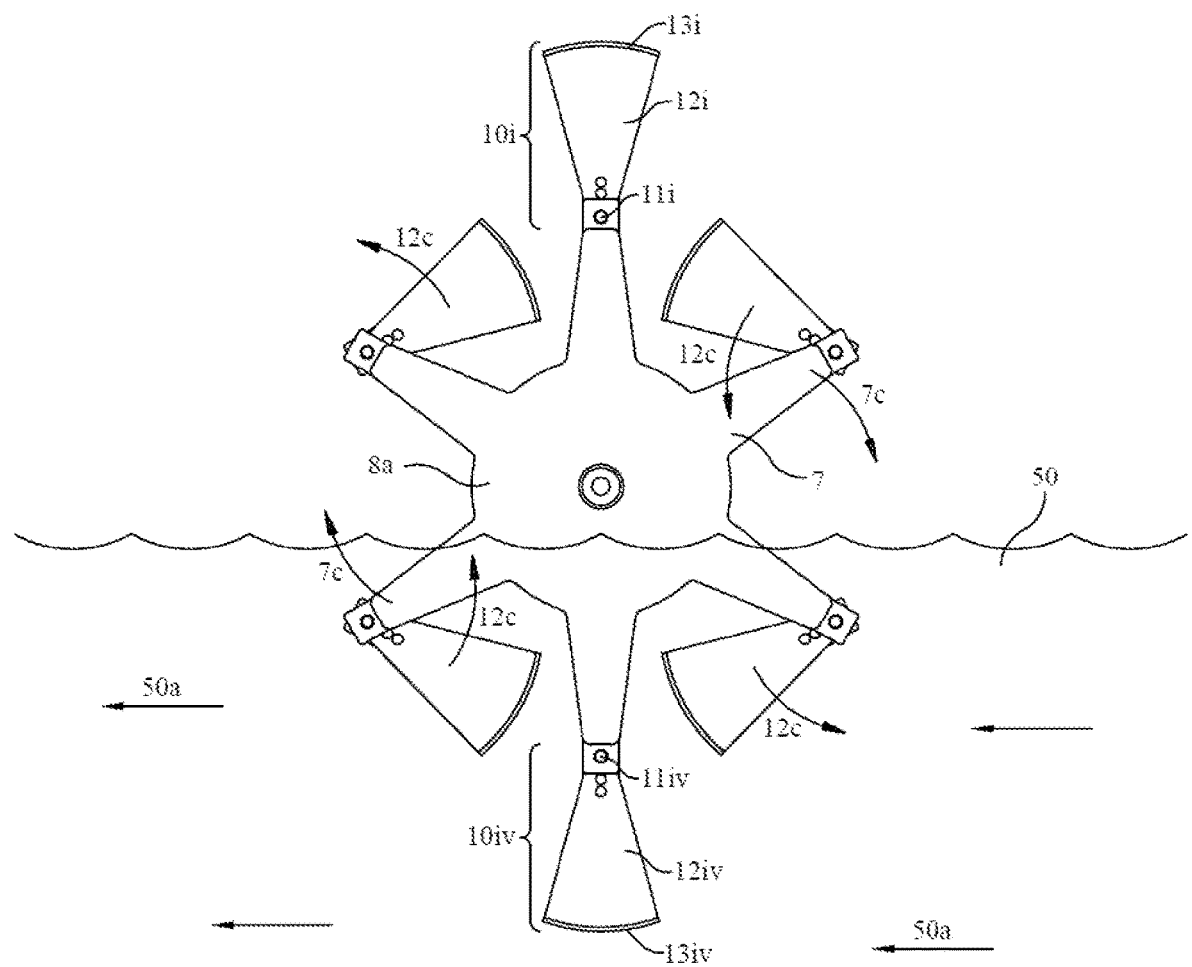
FIGS. 2a and 2b show side views of the turbine of FIG. 1 at different points as it rotates in the stream. The side without the timing assembly is shown here and the side support of the support wheel has been omitted to more clearly show the orientation of the blades.
Figure 2B:
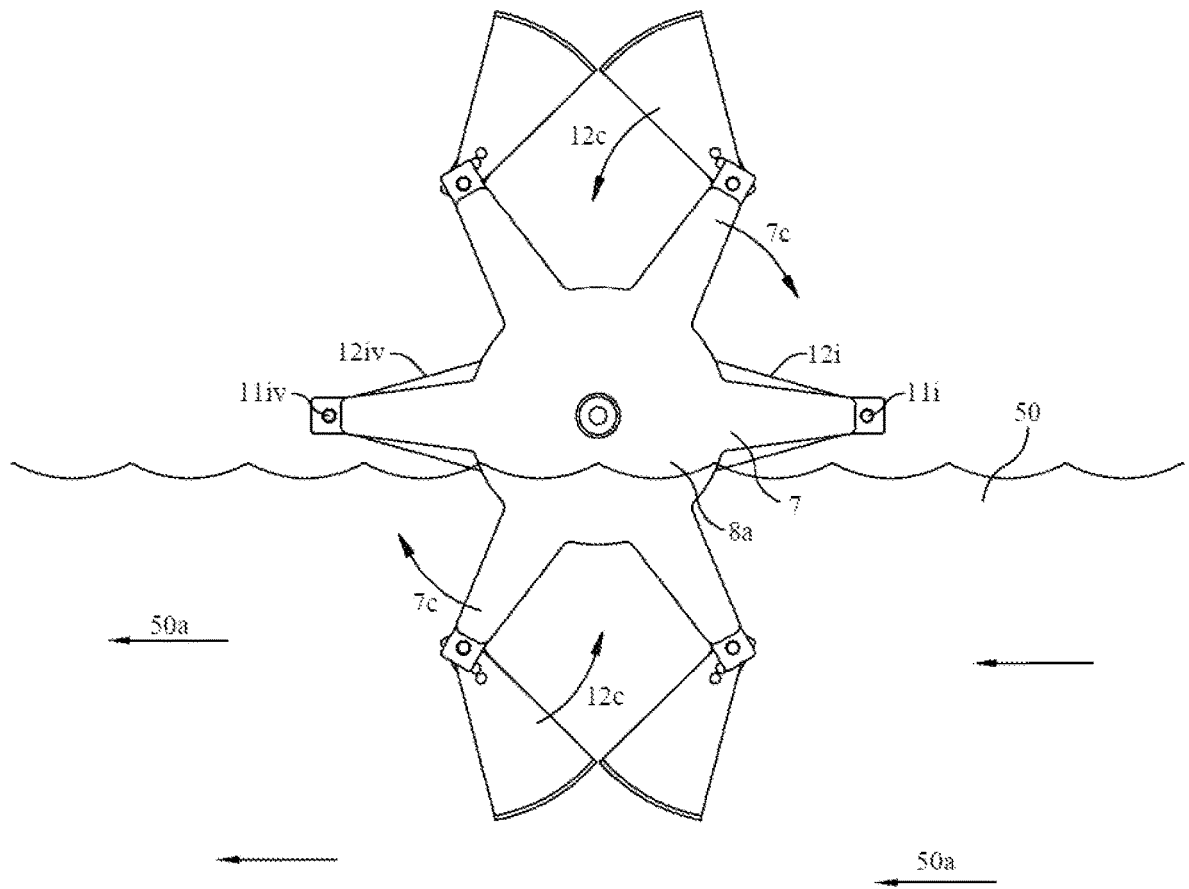

In the embodiment shown in FIG. 1 however, a simple timing assembly 20 is employed which controls each swing arm/blade unit 12/13 to rotate in synchrony at a constant rate. The orientations of swing arm/blade units 12/13 over a revolution of support wheel 7 are shown in detail in FIGS. 2a and 2b. In FIGS. 2a and 2b, side views of turbine 1 are shown on the side without timing assembly 20, namely on the side of side support 8a.

In FIG. 2a, swing arm shaft 11i of swing arm assembly 10i is shown starting at top dead centre in its rotation with support wheel 7. Opposite swing arm assembly 10i on support wheel 7 appears swing arm assembly 10iv with its swing arm shaft 11iv. In FIG. 2a, swing arm shafts 11i and 11iv are passing through high and low points respectively over the rotation of support wheel 7. Blades 13i and 13iv of swing arm assemblies 10i and 10iv are both outboard of their respective swing arm shafts 11i and 11iv and both blades are oriented horizontally.

Next, as support wheel 7 rotates in stream 50, each swing arm/blade unit 12/13 rotates in the direction counter to that of support wheel 7. After a quarter of a revolution of support wheel 7 as shown in FIG. 2b, swing arm shafts 11i and 11iv have rotated so as to both be midway between their highest and lowest points with respect to stream 50 over the rotation of support wheel 7. Further, blades 13i and 13iv (obscured by support wheel 7 in FIG. 2b and therefore not visible) have now been rotated to be inboard of their respective swing arm shafts 11i and 11iv and now both blades are oriented vertically.

Support wheel 7 continues to rotate in stream 50 and after half of a revolution of support wheel 7, swing arm/blade units 12/13 have been rotated such that their orientations are similar to those shown in FIG. 2a but they are now instead located on opposite sides to those shown in FIG. 2a (i.e. swing arm assemblies 12i and 12iv are now located where swing arm assemblies 12iv and 12i were in FIG. 2a). In a like manner, after three quarters of a revolution of support wheel 7, swing arm/blade units 12/13 have been rotated such that their orientations are similar to those shown in FIG. 2b but again they are now instead located on opposite sides to those shown in FIG. 2b (i.e. swing arm assemblies 12i and 12iv are now located where swing arm assemblies 12iv and 12i were in FIG. 2b). Finally, after one full revolution of support wheel 7, swing arm/blade units 12/13 have been rotated to return to the orientations and locations originally shown in FIG. 2a.

Figure 2C:
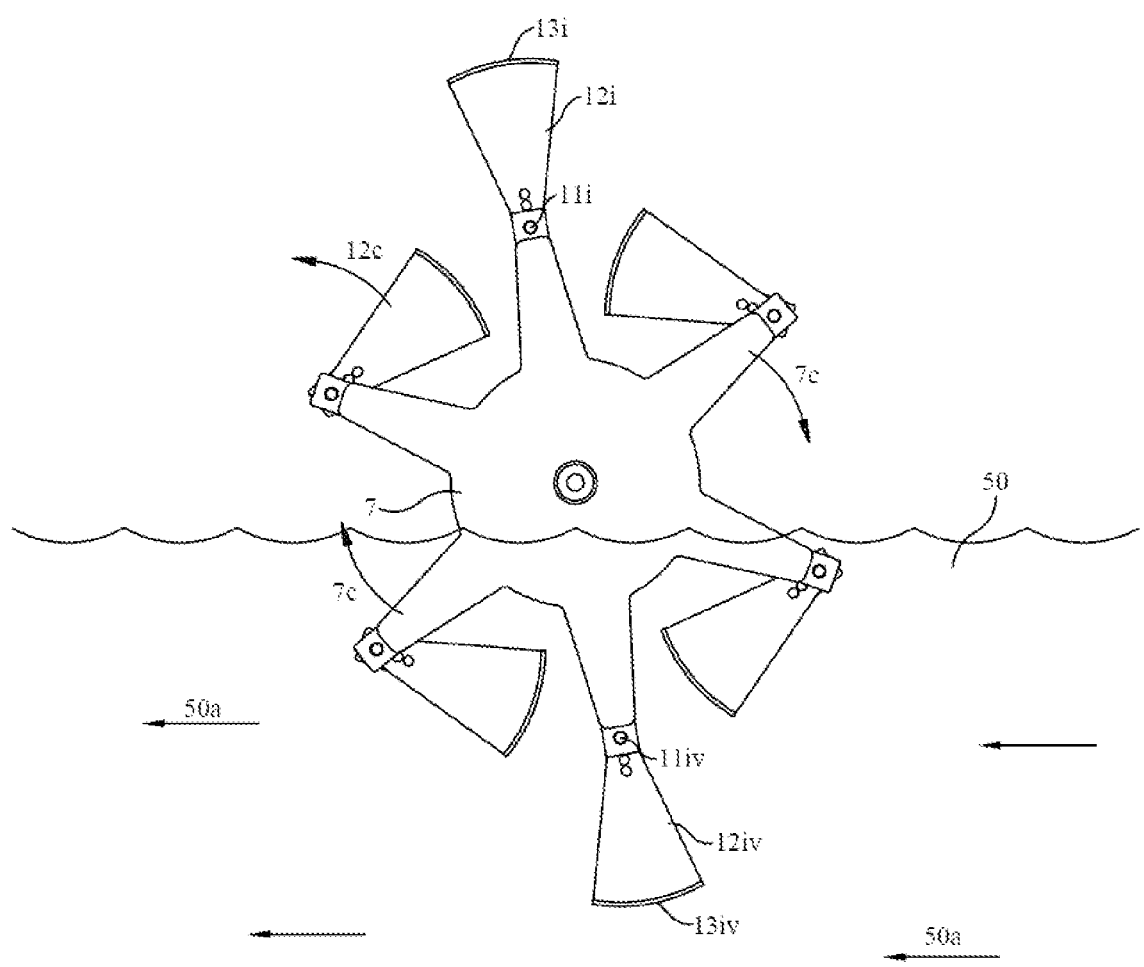

To obtain optimum performance from turbine 1, it may be useful to fine tune the timing cycle of support wheel 7 and swing arm/blade units 12/13 with respect to flowing stream 50. This may be desirable for instance if the velocity of flowing stream 50 is not uniform as a function of depth. One possible method for fine tuning the timing cycle is to advance or retard the rotation of support wheel 7 with respect to that shown in previous FIGS. 2a and 2b. For example, FIG. 2c shows a side view of the same turbine shown in FIG. 2a except that the rotation of support wheel 7 and hence each of the swing arm/blade units 12/13 has been advanced by about 20° with respect to what is shown in FIG. 2a.

One of the advantages of the present invention is that turbine 1 may be operated at greater dip depths in flowing stream 50. For instance, turbine 1 may be dipped to depths up to about 90% of the radius of support wheel 7. At such significant dip depths then, when blade 13i is at the location shown in FIG. 2b, it is just at the point of entering stream 50. In a like manner, when blade 13iv is at the location shown in FIG. 2b, it is just at the point of exiting stream 50. Consequently, each blade 13 in turbine 1 thus enters stream 50 essentially vertically and in a like manner, each blade 13 also exits stream 50 essentially vertically. Further, each blade 13 is essentially horizontal when their respective swing arm shafts 11 are at their highest and lowest points during rotation of support wheel 7 (as shown in FIG. 2a).

Figure 3A:
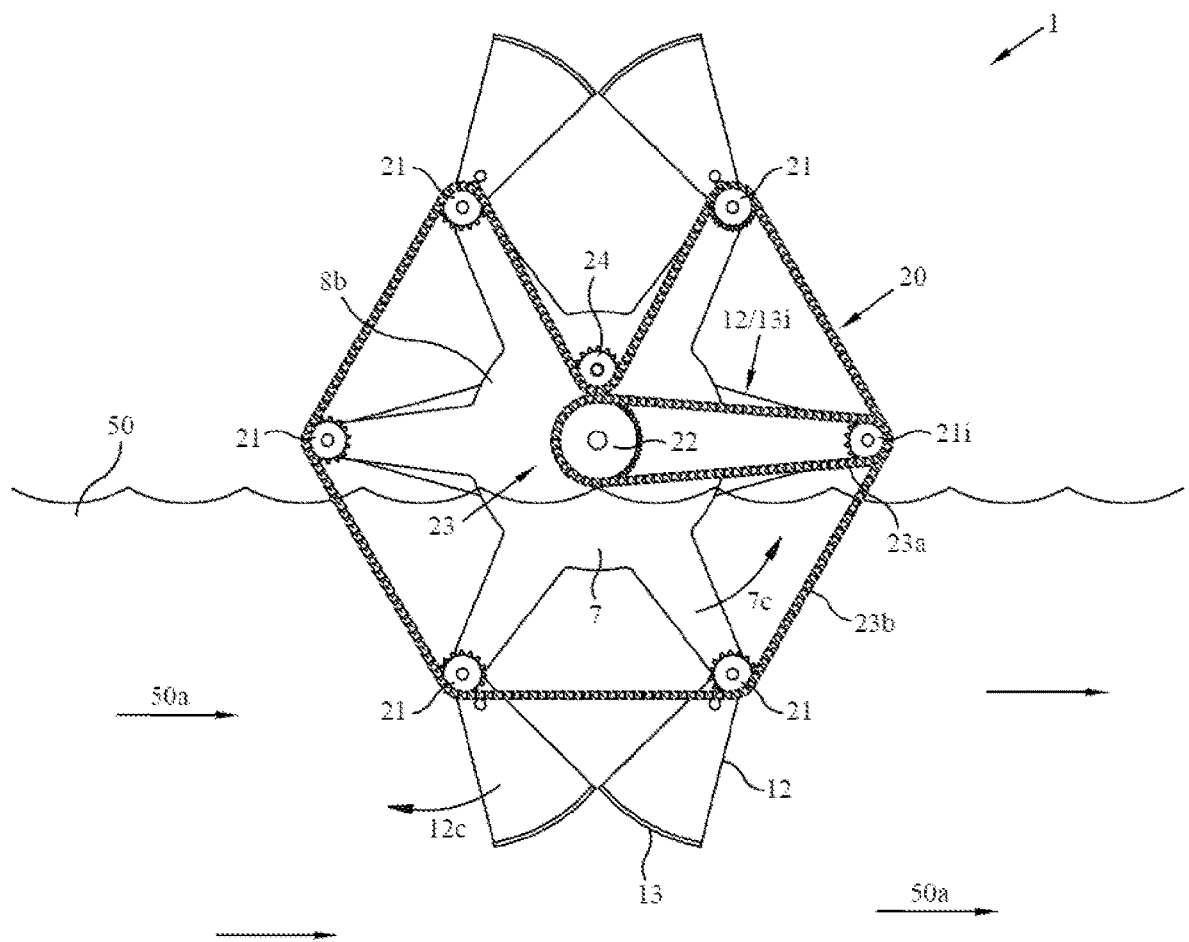
FIG. 3a shows a side view of the turbine of FIG. 1 on the side comprising a timing assembly for synchronously adjusting the blades at a constant rate.

Suitable timing assemblies for controlling the rotation of the swing arm/blade units 12/13 in the manner described above are shown in FIGS. 3a through 3c. All are fairly simple mechanical constructions and are based on a set of sprockets for each swing arm/blade unit 12/13, a stationary sprocket, and a drive chain system. FIG. 3a shows a side view of one suitable arrangement on the side of turbine 1 comprising timing assembly 20, namely support side 8b. Attached to each rotating swing arm blade unit 12/13 is respective sprocket 21 which is used to drive swing arm blade unit 12/13. Here, sprocket 21i for swing arm/blade unit 12/13i is shown as a double sprocket for chain driving purposes. Stationary timing sprocket 22 is fixedly attached to frame 3 at the desired advance or retard setting. Here, drive chain system 23 comprises two chains 23a and 23b. Chain 23a interconnects and "walks around" timing sprocket 22 to one of the two sprockets in double sprocket 21i. Rotation of swing arm/blade unit 12/13i is thus driven by timing sprocket 22 via chain 23a. Chain 23b interconnects the other of the two sprockets in double sprocket 21i to each of the sprockets 21 in timing assembly 20. Rotation of all the other swing arm/blade units 12/13 are thus driven by double sprocket 21i via chain 23b. Idler sprocket 24 is also provided as shown to provide tension in drive chain 23b. The sprocket sizes of each sprocket 21, including sprocket 21i, in FIG. 3a are all the same; i.e. the ratios are 1:1. Timing sprocket 22 however is twice the size of sprockets 21; i.e. ratio of timing sprocket 22 to each sprocket 21 is 2:1.

Figure 3B:
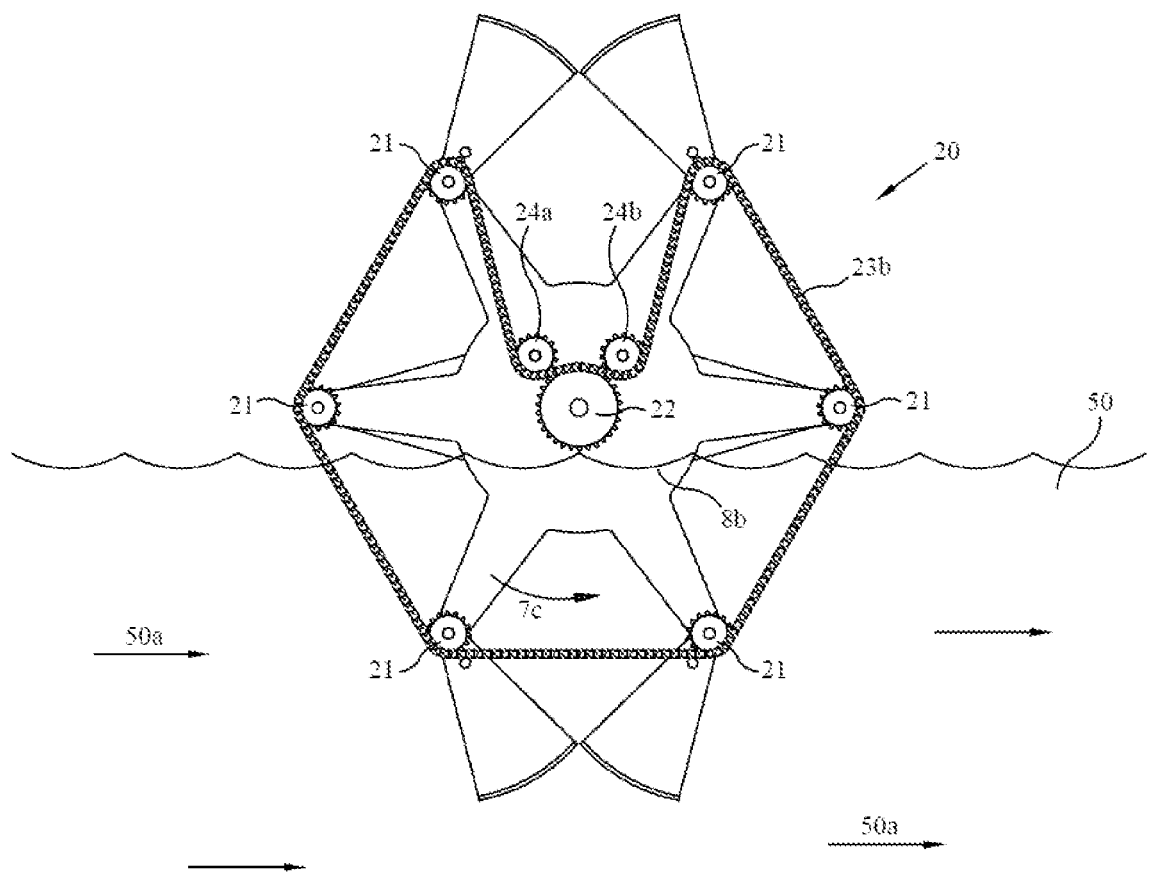
FIG. 3b shows a view of an alternative embodiment of a timing assembly for the turbine of FIG. 1.

An alternative arrangement for timing assembly 20 is shown in FIG. 3b. Again, a side view on support side 8b is shown. Timing assembly 20 here is similar to that shown in FIG. 3a except that a single chain 23b is used (chain 23a being omitted). Here though, two tensioning sprockets 24a and 24b are provided to engage chain 23b with timing sprocket 22, thereby interconnecting all sprockets 21 and timing sprocket 22.

Figure 3C:
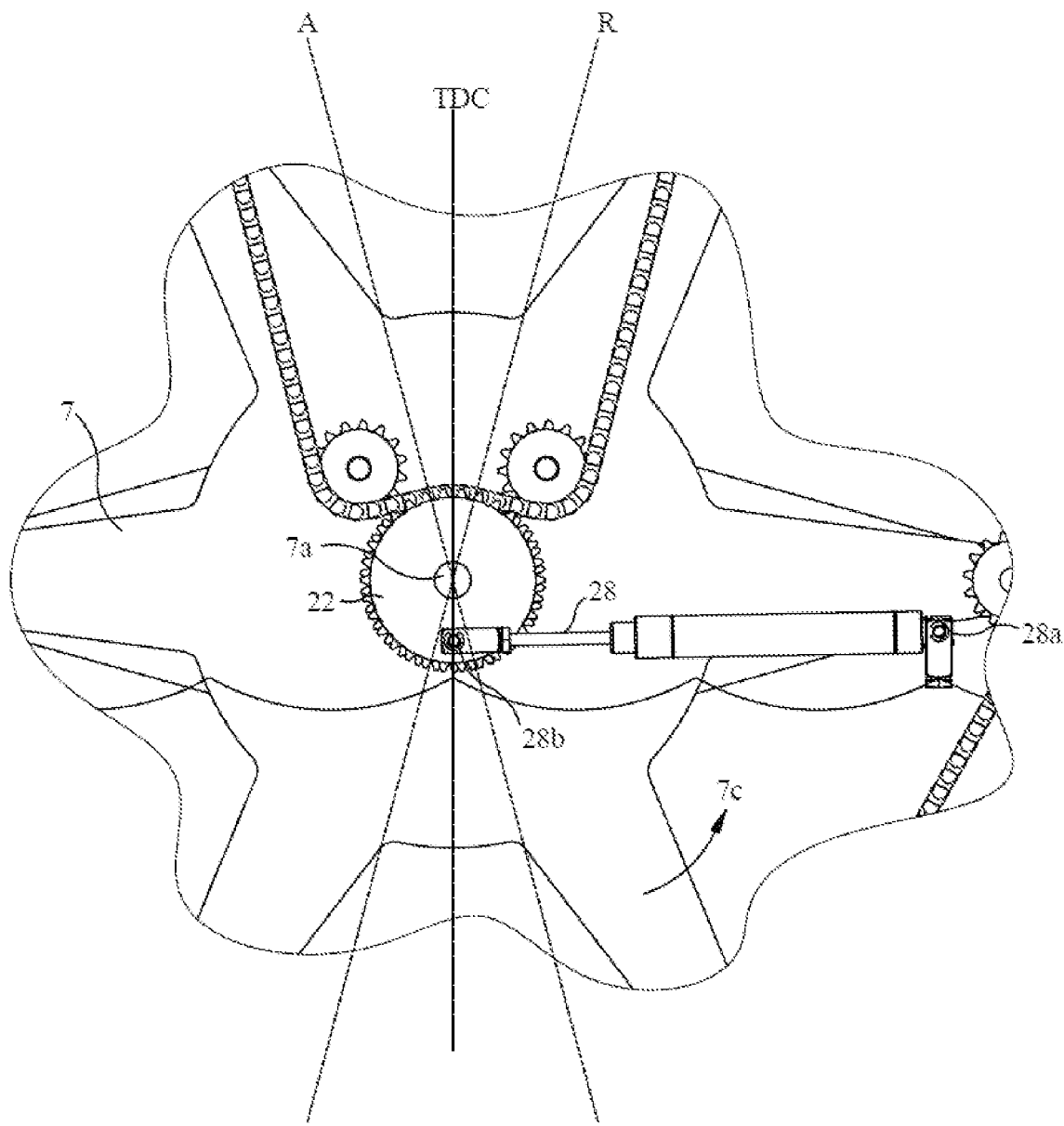
FIG. 3c shows a view of an alternative embodiment to that of FIG. 3c in which an alternative timing assembly is used for advancing or retarding the adjustment of the blades.

FIG. 3c shows a view of a more sophisticated alternative timing assembly to that shown in FIG. 3b which can now be used to advance or retard the rotation of the swing arm/blade units 12/13 to a limited extent with rotation of support wheel 7. (The view shown in FIG. 3c shows an enlarged view of only a portion of turbine 1 in the vicinity of centre 7a of support wheel 7. Thus, some elements appearing in FIG. 3b are not visible here.) Here, stationary timing sprocket 22 is attached to frame 3 via adjustment arm 28 which allows for the orientation of stationary timing sprocket 22 to be adjusted to a certain extent with respect to flowing stream 50. Adjustment is accomplished by increasing or decreasing the length of adjustment arm 28 which is attached to frame 3 at end 28a and to either timing sprocket 22 or to support wheel 7 at end 28b. As shown in FIG. 3c, decreasing the length of adjustment arm 28 serves to advance the rotation of support wheel 7 and timing sprocket 22 while increasing the length serves to retard the rotation. In FIG. 3c, the dashed line TDC is used represent the top dead centre position of FIG. 2a for reference purposes. The dashed lines A and R then represent advanced and retarded orientations respectively with reference to TDC. (Those skilled in the art will appreciate that a similar adjustment arm arrangement may equally be applied to the embodiment shown in FIG. 3a.)

Figure 4:
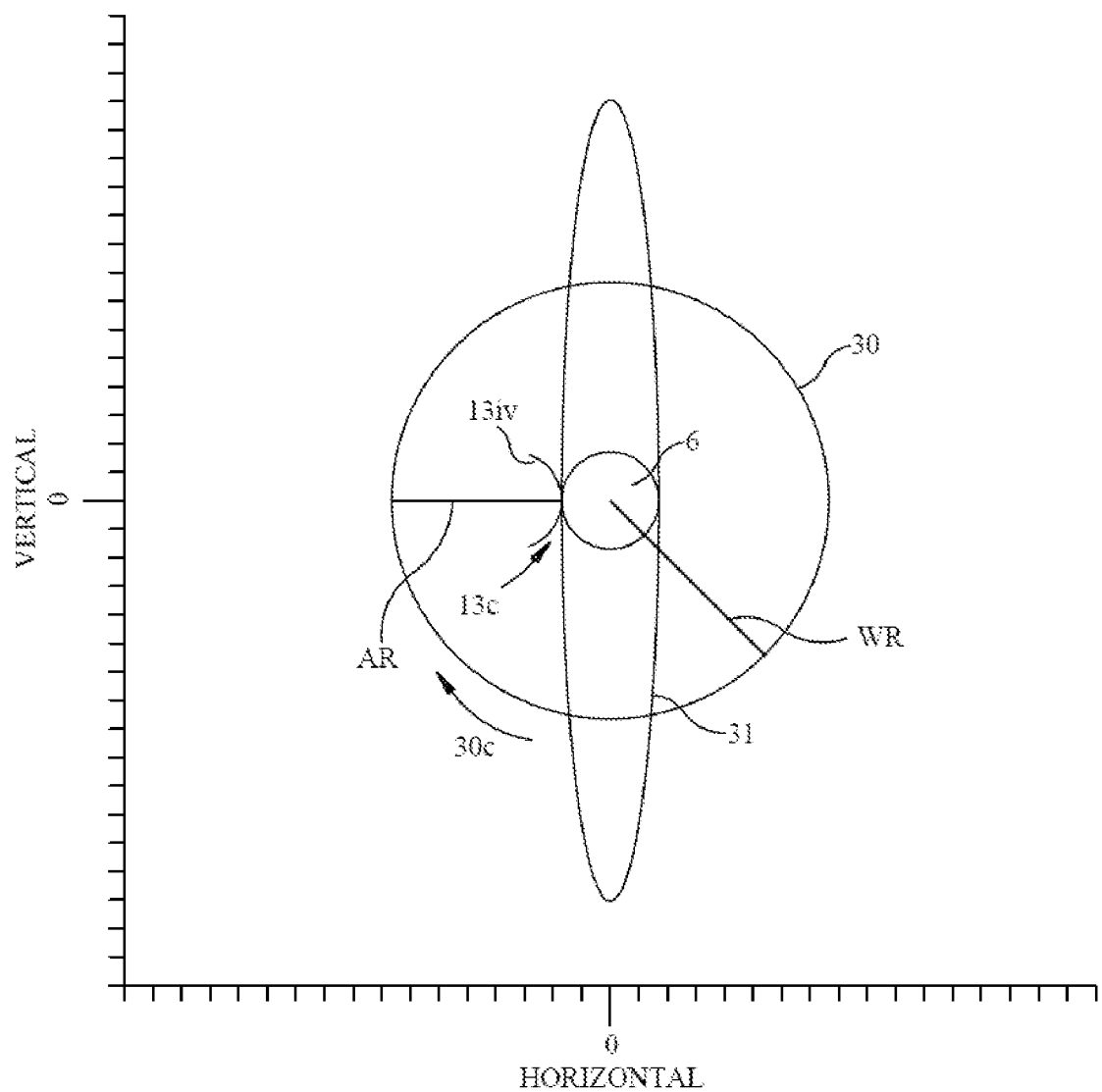
FIG. 4 plots the paths of the blade centres and the swing arm shafts of a turbine similar to that of FIG. 1 as the support wheel rotates.

FIG. 4 is provided to better visualize the definitions of support wheel radius and swing arm radius and also to show the paths of the centres of blades 13 and swing arm shafts 11 as support wheel 7 rotates. FIG. 4 illustrates these from the perspective of support side 8a. (FIG. 4 is representative of an exemplary turbine similar to that of turbine 1 in which the relative ratio of swing arm radius to that of the wheel radius is about 0.77 and is to scale.) Wheel axle 6 is shown at the centre of FIG. 4. The path of swing arm shafts 11 is denoted by path 30 (which also represents the location of circumference 7b of support wheel 7). The path of the centres of blades 13 is denoted by path 31. For reference, blade 13i is also shown in the orientation and location as it would appear if visible in FIG. 2b. Segment WR thus illustrates the support wheel radius and segment AR illustrates the swing arm radius associated with blade 13i. Further in FIG. 4, the direction of rotation of support wheel 7 is shown by arrow 30c and the direction of rotation of blade 13i is shown by arrow 13c.

As is evident from FIG. 4, path 31 of the blade centres is a markedly oval path. With appropriate selection of the number of swing arm assemblies employed, wheel axle diameter, support wheel radius and swing arm radius, a short axis for oval path 31 can be obtained that just barely clears wheel axle 6 while still preventing the rotating swing arm/blade units 12/13 from interfering with one another. In desirable embodiments, the ratio of the swing arm radius/support wheel radius can be greater than or about 0.33, and particularly greater than or about 0.67. The greater this ratio is, the more that downstream drift (represented by segment DD in FIG. 4) is desirably reduced. With the blades following the path defined by path 31, combined with a desired varied orientation of the blades as support wheel 7 rotates, blades 13 experience greater driving forces from both lift and drag than can be obtained from conventional waterwheels.

Conventional waterwheels or turbines derive most of their energy from drag forces alone acting on the blades and typical efficiency levels are in the 25-35% range. Further, the ratio of blade tip velocity to the velocity of the flowing stream is typically limited to about 0.44 in conventional turbines. The remaining energy available from the flowing stream or stream velocity is lost due to downstream drift of the blades and/or the blade surfaces. (In a conventional waterwheel with fixed blades, only the leading blades intercept the fast incoming stream flows, while the trailing blades are exposed to turbulent and slowed flows and impart little energy to the rotation of the waterwheel.) Further still, conventional waterwheels have a typical maximum practical dip depth of about 25-30% of the wheel diameter in order to minimize shoveling by the trailing blades. This limits the available volume of flowing water that can be tapped for energy purposes.

Without being bound by theory, the present invention provides several advantages over conventional waterwheels. The present turbine enjoys greater efficiency by deriving more energy from both drag and lift forces encountered by the blades as their orientation changes within the stream as they pass through their elliptical rotation. As a result of each blade being constantly in motion, the leading blades are constantly being exposed to new full velocity flows which is unlike a conventional water wheel where the leading blade blocks flows to the trailing blades and leaves them wallowing in large vortices. In the present invention, the trailing blades impart energy into the rotation by interacting with high flows and small vortices left by the passing of the leading blades through the swept area. Further, in the present invention, the rotation rate of the support wheel (and hence blade tip velocity) is not defined by the downstream drift of the blades as with a conventional water wheel. With the present arrangement with reduced downstream drift, the support wheel is able to rotate faster, with the speed at the support wheel circumference operating closer to unity with respect to the velocity of the flowing stream. With appropriate design and operation then, it is expected that a potential doubling of support wheel rotation rate as compared to that of a conventional water wheel (which is ~0.44 with respect to the stream) and support wheel circumference velocity (e.g. ~0.88 or greater with respect to the stream) may be achieved. Since the energy captured by a turbine is a function of this velocity squared, the additional energy captured by such a turbine may be expected to substantially increase because of the oval blade path and the doubling of the stream velocity interacting on the blades.

Figure 5A:
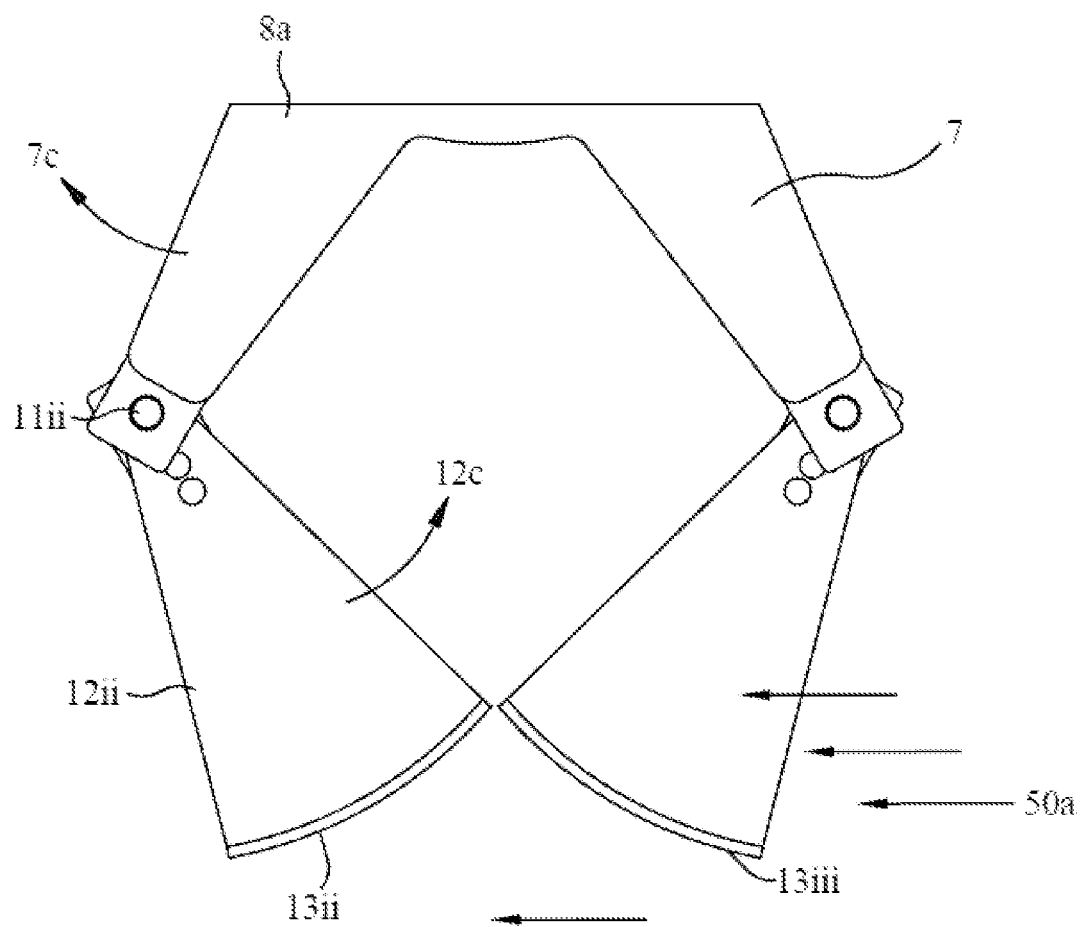
FIGS. 5a and 5b illustrate novel aspects of flow associated with the turbine of FIG. 1.
Figure 5B:
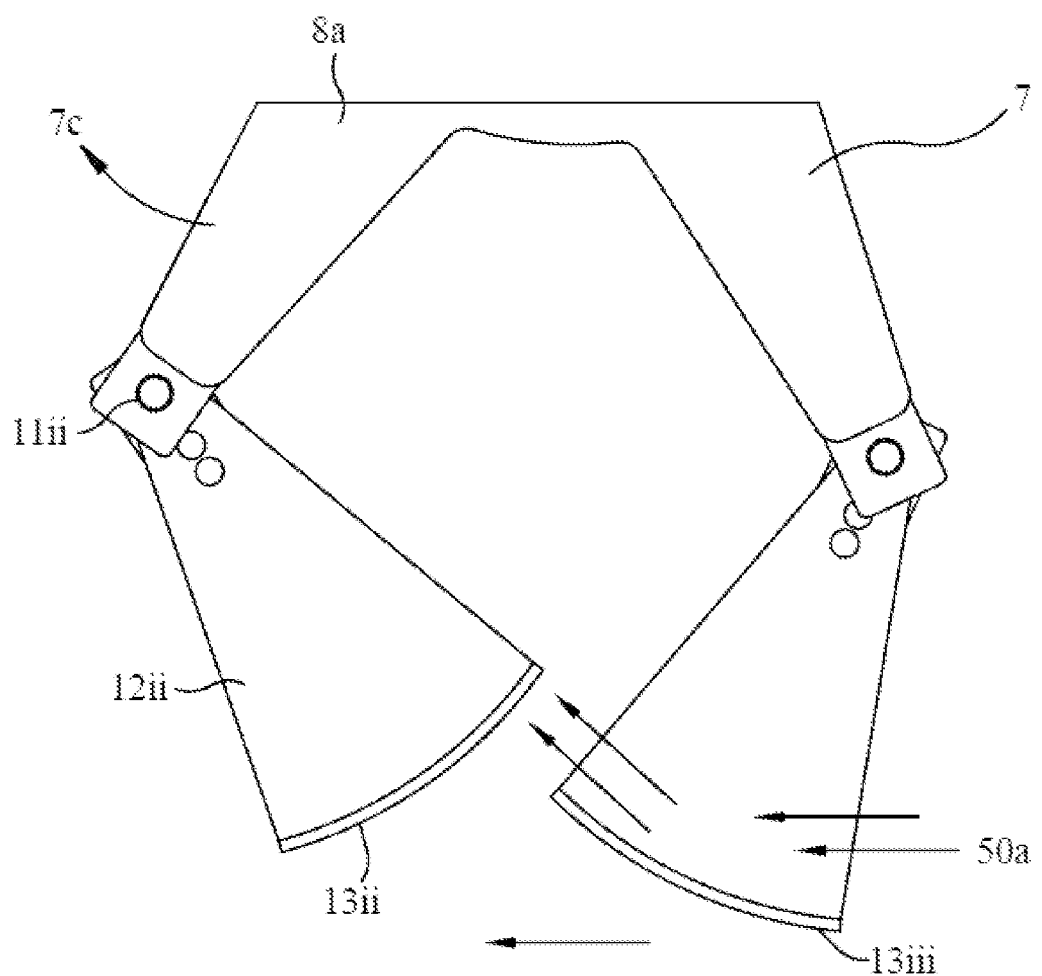

FIGS. 5a and 5b illustrate with reference to swing arm shaft 11ii and swing arm 12ii aspects of flow associated with the exemplary inventive turbine of FIG. 1 that are not experienced with conventional waterwheels and yet which may result in improved performance and efficiency. FIG. 5a shows a momentary point in the rotation of the turbine of FIG. 1 where stream flow to blade 13iii is adversely being affected by blade 13ii. FIG. 5b shows a point just further along in the rotation of turbine 1 where stream flow is now redirected by blade 13ii to trailing blade 13iii. Advantageously, this redirected flow provides additional drag and energy to trailing blade 13iii.

As discussed above, the present invention enjoys advantages regarding improved energy capture and efficiency, reduced downstream drift of the blades, and greater potential dip depths with corresponding increased swept area. Further, it is evident that the turbine can be appropriately controlled such that the turbine blades desirably have a clean entrance (essentially vertical) when entering the stream and a desirably clean exit (essentially vertical, with no shoveling of the downstream blade) when exiting the stream.

A useful advantage of the invention is the ability to advance or retard the timing of the blade path 31 of FIG. 4. Depending on other situation variables, it may be preferred to either advance or retard the blade path 31 from that shown. For instance, the flow velocity profile in a flowing stream may not be uniform as a function of depth (e.g. the flow may be faster at greater depth). It can be useful to be able to adjust the timing in order to optimize energy capture for such situations.

A yet further advantage is that the oval blade path allows for shorter distances from the blade entrance to exit in a stream. In turn, this allows the mounting arrangement of the turbine on either the stream bottom or on a floating barge to channel more stream flow and velocity through the now shorter turbine opening in which the turbines blades operate.

This device is expected to be more effective than other conventional waterwheels or turbines when lower stream velocities are involved. This is because the blades are interacting with higher velocity than a conventional waterwheel does and therefore the present device should start (known as "cutting in") and operate effectively in lower flow rates.

While the preceding Figures describe one possible simple embodiment of the invention, it will be appreciated by those skilled in the art that numerous variants are also possible. For instance, it is appreciated that the wheel assembly employed can involve arrangements where the wheel axle is fixed with respect to the frame (and does not rotate) or alternatively where it is fixed to the support wheel (and does rotate). Such arrangements can employ various bushing and/or bearing configurations known to those in the art. In a like manner, the swing arm assemblies employed can also involve arrangements where the swing arm shafts are fixed with respect to the support wheel or alternatively where they are fixed to their respective swing arms. Further still, the swing arm shafts need not be provided as single piece shafts miming through each pair of swing arms as shown in FIG.

1. For instance, two shorter and separate pin types of shafts may be employed at each of the pair of swing arms instead. The full width shafts are a modest detriment to the turbine operation and thus it can be advantageous to remove them.

Further, while the preceding Figures describe an embodiment with six swing arm assemblies, it is appreciated that more or less may be considered (e.g. embodiments may conceivably employ three or more swing arm assemblies). In designs similar to those depicted however, a total of five or six swing arm assemblies may be preferred in order to allow for the use of relatively longer swing arms and greater blade heights (since interference with each other and/or the wheel axle during operation must be avoided) and hence achieve less downstream drift. Further still, the side supports used for the support wheel and/or the swing arms may be of a spoke type of construction as opposed to solid plates. In addition, embodiments which involve a single centre support for the support wheel may be considered or even multiple equivalent supports as circumstances allow.

Figure 6:
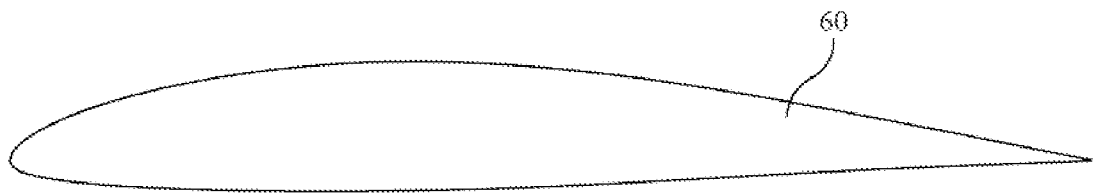
FIG. 6 shows an optional foil shaped blade for use with uni-directional stream flows.

Yet further, different blade shapes may be considered. For bi-directional flowing streams (e.g. tidal streams), it can be preferred that turbine function similarly in either direction of rotation. In such a case, the blades are then symmetrically shaped so as to function in the same manner when the steam flows in either direction. On the other hand, for a stream which always flows in one direction, the blades may advantageously be foil shaped in order to impart additional rotational energy into the rotation of the support wheel. FIG. 6 shows a sketch of an optional foil shaped blade 60 for use with uni-directional stream flows.

While the preceding disclosed simple timing assemblies and rotation controls in which all swing arm/blade units and optionally the blades therein all moved synchronously at a constant linear rate, non-synchronous control for variable swing arm/blade units and/or variable blade attack angles may be contemplated for instance by using appropriate individual controls of each.

In other embodiments of the invention, instead of operating in synchrony throughout an entire cycle, individual timings of individual swing arm assemblies 10 might instead be adjusted such that during the upper half of the wheel assembly rotation (i.e. above the surface of the flowing stream), a shift in the timing from a 2:1 ratio to a 1:1 ratio may be employed to keep the swing arms facing in towards the centre axle to reduce the overall height profile of the turbine. Further, the swing arm/blade units would only need to be rotated for the in-stream portion of their cycle. In addition, with three or more support wheels (e.g. wider applications), the timing could be offset for smoother operation, for more uniform coverage of the swept area, and for forming smaller downstream vortices.

In yet other and somewhat more complex embodiments of the invention, the attack angle of blades 13 may also desirably be varied during operation in order to optimize energy obtained from the flowing stream. This may be achieved for instance by incorporating additional hardware (not shown in the figures) that allows for each blade 13 to adjust so as to achieve an optimal angle of attack with respect to the stream regardless of the orientation of their respective swing arms 12 which are under the control of timing assembly 20. In one possible embodiment, instead of being fixedly attached to swing arms 12, blades 13 may instead be mounted to respective swing arms 12 with pins that allow for movement. The movement could be controlled by simple shaft and cam assemblies so that the attack angle of each blade 13 can be varied during operation of turbine 1. Control of the attack angle and the timing thereof can then be appropriately accomplished by coupling blades 13 via control rods (not shown) to eccentric cranks (not shown) which are fixedly mounted to support wheel 7 positioned around swing arm shafts 11. With such control, in principle each blade on each swing arm may be optimally adjusted at all time as the turbine rotates.

Still further, by appropriately overriding the advance and/or retard control, the orientation of the wheel assembly can be adjusted such that the long axis of oval path 31 of the blade centres (see FIG. 4) is now horizontal instead of vertical (as it is during normal operation). This can be useful in that the wheel assembly can almost entirely be removed from the stream to avoid heavy debris damage during seasonal flooding or for service and/or shut-down. For instance, even for a wheel assembly dipped to a depth of about 90% of the support wheel radius as shown in the preceding figures, only the tips of two of the swing arm assemblies may remain in the stream. Embodiments comprising short pins instead of full width shafts for the swing arm shafts are preferred in such a case to minimize collision with debris. Complete removal from the stream during service or shut-down is obviously also possible if lower dip depths are employed with only minor rotation required to access all serviceable parts.

The following Examples have been included to illustrate certain aspects of the invention but should not be construed as limiting in any way.

Examples

A demonstration turbine essentially similar to that shown in FIGS. 1 through 3*a* was assembled with the following dimensions:

support wheel width (i.e. same as wheel axle length) was 42 cm support wheel radius (i.e. WR) was 28 cm swing arm radius (i.e. AR) was 19 cm width of blades (i.e. same as swing arm shaft lengths) was 40 cm blade shapes were curved to match the swing arm radii, i.e. blades had radius of curvature of 19 cm, and the curved height of the blades was 10 cm The ratio of the swing arm radius/support wheel radius (AR/WR) was thus just over 0.67. The demonstration turbine was then taken into the field (a tidal stream in Juskatla Narrows in British Columbia, Canada) for evaluation. In preliminary testing to date, the turbine qualitatively performed better (rotating substantially faster) than a conventional waterwheel of similar size.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. An undershot turbine for capturing energy from a flowing stream having a horizontal flow direction and velocity comprising:

a frame;

a wheel assembly comprising:

a horizontal wheel axle;
a support wheel having a centre and a circumference wherein the wheel axle is located at the centre of the support wheel and wherein the support wheel is rotatably mounted with respect to the frame; and
a plurality of swing arm assemblies each comprising:
a horizontal swing arm shaft located at the circumference of the support wheel;
a swing arm having an axle end and a blade end wherein the swing arm shaft is located at the axle end of the swing arm and the swing arm is rotatably mounted with respect to the support wheel; and
a blade attached to the blade end of the swing arm; and
a timing assembly configured to control the rotation of each swing arm with attached blade such that, as the support wheel rotates, each swing arm with attached blade rotates counter to the direction of rotation of the support wheel and completes one full revolution for every full revolution of the support wheel and such that each blade is:
i) rotated inboard of its respective swing arm shaft before it enters the stream;
ii) then rotated outboard of its respective swing arm shaft as it passes through the stream; and
iii) then rotated inboard of its respective swing arm shaft before it exits the stream.

2. The undershot turbine of claim 1 wherein the timing assembly is configured to control the rotation of each swing arm with attached blade such that in step i) each blade enters the stream essentially vertically.

3. The undershot turbine of claim 1 wherein the timing assembly is configured to control the rotation of each swing arm with attached blade such that in step iii) each blade exits the stream essentially vertically.

4. The undershot turbine of claim 1 wherein the timing assembly is configured to control the rotation of each swing arm with attached blade such that in step ii) each blade is essentially horizontal when its respective swing arm shaft is passing through its lowest point in the stream.

5. The undershot turbine of claim 1 wherein the timing assembly is configured to control the rotation of each swing arm with attached blade such that each blade is essentially horizontal when its respective swing arm shaft is at its lowest or highest point with respect to the stream and essentially vertical when its respective swing arm shaft is midway between its lowest and highest points with respect to the stream.

6. The undershot turbine of claim 1 wherein the plurality of swing arms with attached blades rotate in synchrony at a constant rate.

7. The undershot turbine of claim 6 wherein the timing assembly comprises a set of sprockets for each of the swing arms with attached blades, a stationary sprocket around the wheel axle, and a drive chain system interconnecting each of the set of sprockets and the stationary sprocket.

8. The undershot turbine of claim 1 wherein the timing assembly is configured to advance or retard the rotation of each of the swing arms with attached blades as the support wheel rotates.

9. The undershot turbine of claim 8 wherein the timing assembly is configured to advance or retard the rotation of each of the swing arms with attached blades up to 20 degrees as the support wheel rotates.

10. The undershot turbine of claim 1 wherein:
the support wheel comprises a pair of side supports and the wheel axle is located at the centre of the support wheel between the pair of side supports; and
each of the swing arm assemblies comprises a pair of swing arms and each swing arm shaft is located at the axle end of each of the pair of swing arms between each of the pair of swing arms.

11. The undershot turbine of claim 1 further comprising the plurality of swing arm assemblies comprising greater than or equal to three swing arm assemblies.

12. The undershot turbine of claim 1 wherein the distance between each of the blade centres and the swing arm shafts defines a swing arm radius and the profile of each of the blades is shaped to match the swing arm radius.

13. The undershot turbine of claim 1 wherein:
the distance between each of the swing arm shafts and the wheel axle defines a support wheel radius;
the distance between each of the blade centres and the swing arm shafts defines a swing arm radius; and
the ratio of the swing arm radius/support wheel radius is greater than or about 0.33.

14. The undershot turbine of claim 13 wherein the ratio of the swing arm radius/support wheel radius is greater than or about 0.67.

15. A method of capturing an increased amount of energy from the surface of the flowing stream having a horizontal flow direction and velocity, the method comprising:
obtaining the turbine of claim 1;
dipping the turbine into the stream;
allowing the support wheel to rotate at a wheel velocity; and
capturing energy from the rotating support wheel.

16. The method of claim 15 wherein the distance between each of the swing arms and the wheel axle defines a support wheel radius, the distance between each of the blade centres and the swing arm shafts defines a swing arm radius, and the ratio of the swing arm radius/wheel radius is greater than or about 0.33.

17. The method of claim 15 wherein the distance between each of the swing arm shafts and the wheel axle defines a support wheel radius and the turbine is dipped into the flowing stream to a depth up to 90% of the support wheel radius.

* * * * *